US012501138B2

United States Patent
Tian et al.

(10) Patent No.: US 12,501,138 B2
(45) Date of Patent: Dec. 16, 2025

(54) HETEROGENEOUS MICRO-OPTICS IMAGING MODULE AND METHOD AND APPARATUS FOR IMAGE RECONSTRUCTION THEREOF

(71) Applicant: LITEMAZE TECHNOLOGY (SHENZHEN) CO., LTD., Guangdong (CN)

(72) Inventors: Yibin Tian, Guangdong (CN); Mingshan Sun, Guangdong (CN); Wei Chen, Guangdong (CN); Zhiyuan Zhang, Guangdong (CN)

(73) Assignee: LITEMAZE TECHNOLOGY (SHENZHEN) CO., LTD., Shenzhen (CN)

( * ) Notice: Subject to any disclaimer, the term of this patent is extended or adjusted under 35 U.S.C. 154(b) by 281 days.

(21) Appl. No.: 18/215,892

(22) Filed: Jun. 29, 2023

(65) Prior Publication Data

US 2023/0345101 A1 Oct. 26, 2023

Related U.S. Application Data

(63) Continuation of application No. PCT/CN2021/141824, filed on Dec. 28, 2021.

(30) Foreign Application Priority Data

Dec. 31, 2020 (CN) .......................... 202011635745.7

(51) Int. Cl.
*H04N 23/55* (2023.01)
(52) U.S. Cl.
CPC .................................. *H04N 23/55* (2023.01)

(58) Field of Classification Search
CPC ...................................................... H04N 23/55
(Continued)

(56) References Cited

U.S. PATENT DOCUMENTS

| 8,345,144 B1 * | 1/2013 | Georgiev | ............... | G03B 11/00 |
| | | | | 359/368 |
| 8,400,555 B1 | 3/2013 | Georgiev et al. | | |

(Continued)

FOREIGN PATENT DOCUMENTS

CN 101105543 A 1/2008

OTHER PUBLICATIONS

International Search Report of PCT Patent Application No. PCT/CN2021/141824 issued on Mar. 17, 2022.

*Primary Examiner* — Joel W Fosselman

(57) ABSTRACT

Disclosed in embodiments of the present application is a heterogeneous micro-optics imaging module, including: a micro-optics unit, including multiple optical zones optically shielded from each other, wherein optical parameters of at least two optical zones among multiple optical zones are different from each other; an image sensing unit, provided on a side of the micro-optics unit away from an exterior reflection source, used for converting light processed through multiple optical zones of the micro-optics unit into multiple corresponding image signals. Obviously, multiple different levels of optical information in the same scene may be acquired in the present application by a micro-optics unit provided with multiple optical zones with different optical parameters, so as to increase the richness and volume of acquired image information, which facilitates to decrease the loss of code information during the micro-optics imaging process, thereby increasing the stability of the optimizing process during the micro-optics image reconstruction.

17 Claims, 6 Drawing Sheets

(58) Field of Classification Search
USPC .................................................... 348/222.1
See application file for complete search history.

(56) References Cited

U.S. PATENT DOCUMENTS

2008/0007839 A1    1/2008  Deng et al.
2017/0125476 A1*   5/2017  Kato ..................... G03B 13/36

* cited by examiner

HETEROGENEOUS MICRO-OPTICS IMAGING MODULE AND METHOD AND APPARATUS FOR IMAGE RECONSTRUCTION THEREOF

CROSS-REFERENCE TO RELATED APPLICATIONS

The present application is a Continuation Application of PCT Application No. PCT/CN2021/141824 filed on Dec. 28, 2021, which claims priority of Chinese Patent Application No. 202011635745.7 filed on Dec. 31, 2020 before CNIPA. All the above are hereby incorporated by reference in their entirety.

FIELD OF THE INVENTION

The present application relates to the technical field of information processing, in particular to a heterogeneous micro-optics imaging module and a method and apparatus for image reconstruction thereof.

BACKGROUND OF THE INVENTION

As the computational power of semiconductor processors continuously increases, various computational imaging methods have been proposed in recent years to simplify the structure of vision sensors and add sophisticated imaging functions. One approach is to use a single micro-optics element (MOE) to replace a traditional lens consisting of a combination of multiple lenses, in conjunction with corresponding computational methods to reconstruct 2D or 3D images.

However, the conventional micro-optics imaging module generally adopts a single micro-optics element with uniform optical parameters to cooperate with the image sensing unit for imaging. The surface feature information of the target object obtained by this formed micro-optics imaging solution is relatively simple, which lacks richer feature information to assist in image reconstruction, thereby leading to a less accurate reconstructed image, requiring further processing.

SUMMARY OF THE INVENTION

The technical problem to be solved of the present application is providing a heterogeneous micro-optics imaging module and a method and apparatus for image reconstruction thereof, wherein multiple different levels of optical information in the same scene may be acquired by a micro-optics unit provided with multiple optical zones with different optical parameters, so as to increase the richness and volume of the acquired image information, which facilitates to decrease the loss of code information during the micro-optics imaging process, thereby increasing the stability of the optimizing process during the micro-optics image reconstruction.

In order to solve the technical problems mentioned above, disclosed in the embodiments of the present application, as a first aspect, is a heterogeneous micro-optics imaging module, comprising:
a micro-optics unit, comprising multiple optical zones optically shielded from each other, wherein optical parameters of at least two optical zones among multiple optical zones are different from each other;
an image sensing unit, provided on a side of the micro-optics unit away from an exterior reflection source, used for converting light processed through multiple optical zones of the micro-optics unit into multiple corresponding image signals.

As an optional embodiment, in the first aspect of the present application, optical shielding devices are provided between multiple optical zones, wherein the optical shielding devices are used to prevent light passing through any of the optical zones from entering other optical zones.

As an optional embodiment, in the first aspect of the present application, the optical parameters include one or both of equivalent focal length and optical transfer function, and/or the micro-optics unit is a coded aperture, diffractive optical element, Fresnel lens, microlens array or optical homogenizer.

As an optional embodiment, in the first aspect of the present application, the optical parameters of all optical zones are different from each other, and/or the distance between the optical parameters of any two of the optical zones in all optical zones satisfies the difference maximization principle.

As an optional embodiment, in the first aspect of the present application, the difference between the equivalent focal lengths of any two of the optical zones in all optical zones is less than a predetermined equivalent focal length threshold, and/or the optical parameters of at least two different positions within any one of the optical zones are different from each other.

As an optional embodiment, in the first aspect of the present application, the optical parameters at all positions within any one of the optical zones are different from each other, and/or the optical parameters at any two different positions of different heights within any one of the optical zones are different from each other, and/or the distance between the optical parameters at any two positions with same height within any one of the optical zones satisfies the difference maximization principle.

As an optional embodiment, in the first aspect of the present application, the distance between the optical parameters is the absolute difference, Manhattan distance, Euclidean distance or Minkowski distance between the optical parameters.

Disclosed in the embodiments of the present application, as a second aspect, is a method for image reconstruction of heterogeneous micro-optics imaging module, used for reconstruction of image information acquired by the heterogeneous micro-optics imaging module disclosed in the first aspect of the embodiment of the present application, the method comprising:
acquiring multiple imaging signals obtained by an image sensing unit of the heterogeneous micro-optics imaging module, wherein multiple imaging signals correspond to multiple optical zones respectively;
reconstructing multiple imaging signals based on neural network algorithms so as to acquire images of target objects.

Disclosed in the embodiments of the present application, as a third aspect, is an apparatus for image reconstruction of heterogeneous micro-optics imaging module, used for reconstruction of image information acquired by the heterogeneous micro-optics imaging module disclosed in the first aspect of the embodiments of the present application, the apparatus comprising:
an acquiring module, used for acquiring multiple imaging signals obtained by an image sensing unit of the heterogeneous micro-optics imaging module, wherein multiple imaging signals correspond to multiple optical zones respectively;

a reconstructing module, used for reconstructing multiple imaging signals based on neural network algorithms so as to acquire images of target objects.

Disclosed in the embodiments of the present application, as a fourth aspect, is an apparatus for image reconstruction of heterogeneous micro-optics imaging module, comprising:
a memory, memorized with an executable program, and a processor, coupled with the memory,
wherein the processor, calling the executable program memorized in the memory, implements some or all steps in the method for image reconstruction of heterogeneous micro-optics imaging module disclosed in the second aspect of the embodiments of the present application.

Disclosed in the present embodiment of the application, as a fifth aspect, is a computer program product comprising a non-instantaneous computer readable memory medium memorized with a computer program, the computer program enabling the computer to implement some or all steps in the method of image reconstruction of heterogeneous micro-optics imaging module, disclosed in the second aspect of the embodiments of the present application.

Compared to the prior art, the beneficial effect of the embodiments in the present application are as follows:

disclosed in the embodiment of the present application is a heterogeneous micro-optics imaging module, comprising: a micro-optics unit, comprising multiple optical zones optically shielded from each other, wherein optical parameters of at least two optical zones among multiple optical zones are different from each other; an image sensing unit, provided on a side of the micro-optics unit away from an exterior reflection source, used for converting light processed through multiple optical zones of the micro-optics unit into multiple corresponding image signals. Obviously, multiple different levels of optical information in the same scene may be acquired in the present application by a micro-optics unit provided with multiple optical zones with different optical parameters, so as to increase the richness and volume of the acquired image information, which facilitates to decrease the loss of code information during the micro-optics imaging process, thereby increasing the stability of the optimizing process during the micro-optics image reconstruction.

BRIEF DESCRIPTION OF THE DRAWINGS

In order to illustrate the technical solutions of the embodiments of the present application more clearly, the following drawings are briefly described as required in the context of the embodiments. Obviously, the following drawings only illustrate only some of the embodiments of the present application. Other relevant drawings may be obtained on the basis of these drawings without any creative effort by those skilled in the art.

DETAILED DESCRIPTION OF THE PREFERRED EMBODIMENTS

For a better understanding of the application by those skilled in the art, the technical solutions in the embodiments of the present application are clearly and completely described and discussed below in conjunction with the attached drawings of the embodiments in the present application. Obviously, the embodiments described herein are only some of the embodiments of the present application but not all of them. Based on the embodiments in the present application, all other embodiments acquired by those skilled in the art without inventive effort fall within the scope of protection of the present application.

The terms "first", "second", and the like in the specification, the claims and the above-mentioned drawings of the present application are used to identify different objects and are not intended to describe a particular sequence. In addition, the terms "comprise" and "include", and any derivatives and conjugations thereof, are intended to cover non-exclusive inclusion. For example, a process, method, apparatus, product, or device that comprises a series of steps or units is not limited to the listed steps or units, but optionally also comprises steps or units that are not listed, or optionally also comprises other steps or units that are inherent to those processes, methods, products, or devices.

The term "embodiment" herein means that a particular feature, structure or characteristic described in conjunction with an embodiment may be comprised in at least one embodiment of the present application. The presence of the term in various places in the specification does not necessarily indicate the same embodiment, nor is it a separate or alternative embodiment that is mutually exclusive with other embodiments. It is understood, both explicitly and implicitly, by those skilled in the art that the embodiments described herein may be combined with other embodiments.

Disclosed in the present application is a heterogeneous micro-optics imaging module and a method and apparatus for image reconstruction thereof, multiple different levels of optical information in the same scene may be acquired by a micro-optics unit provided with multiple optical zones with different optical parameters, so as to increase the richness and volume of the acquired image information, which facilitates to decrease the loss of code information during the micro-optics imaging process, thereby increasing the stability of the optimizing process during the micro-optics image reconstruction. The details are described respectively as follows.

Embodiment 1

Figure 1:
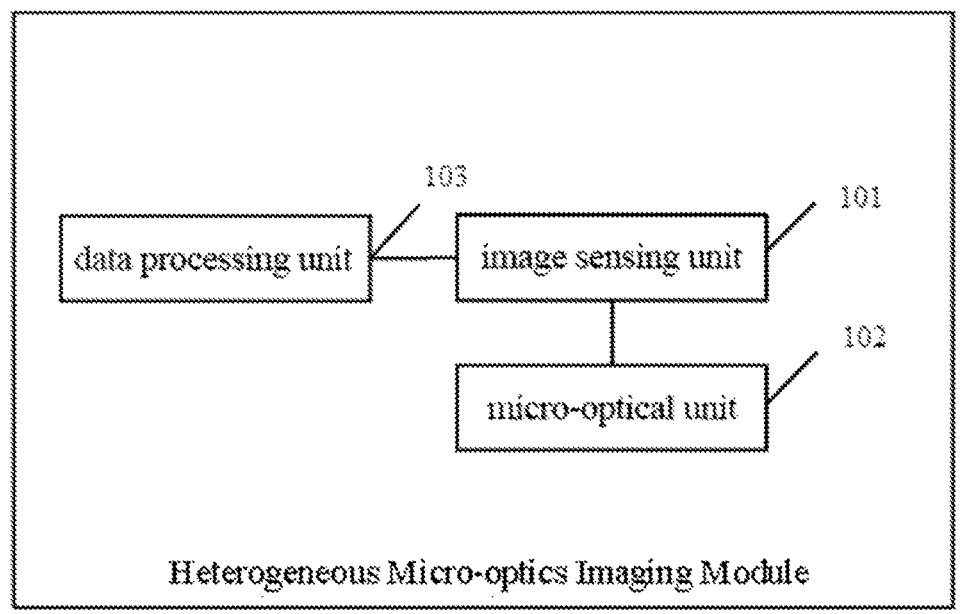
FIG. 1 is a structural diagram of a functional module of the heterogeneous micro-optics imaging module disclosed in the embodiments of the present application.

Referring to FIG. 1, FIG. 1 is a structural diagram of a functional module of the heterogeneous micro-optics imaging module disclosed in the embodiments of the present application. As shown in FIG. 1, the heterogeneous micro-optics imaging module may comprise an image sensing unit 101, a micro-optics unit 102 and a data processing unit 103.

Figure 6A:
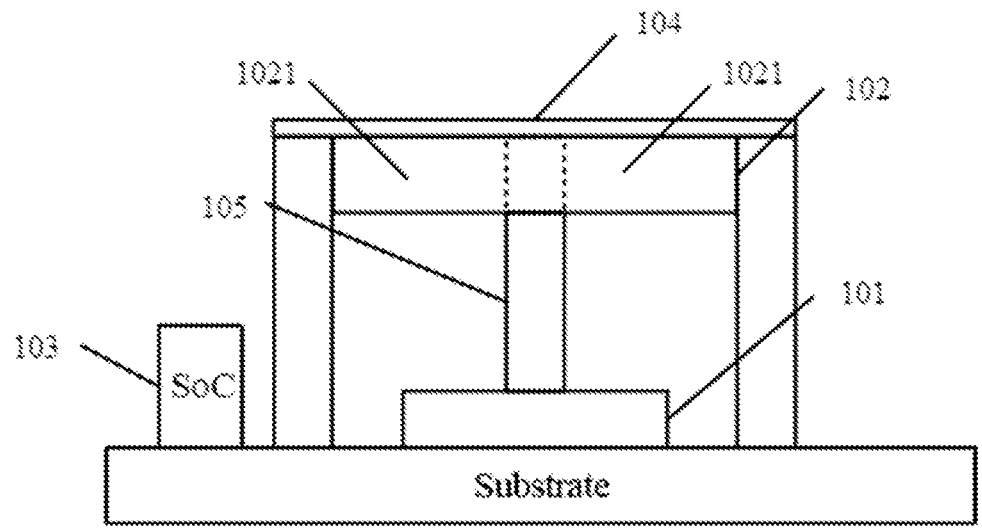
FIG. 6a and FIG. 6b are illustrative structural diagrams of a heterogeneous micro-optics imaging module disclosed in the embodiments of the present application.
Figure 6B:
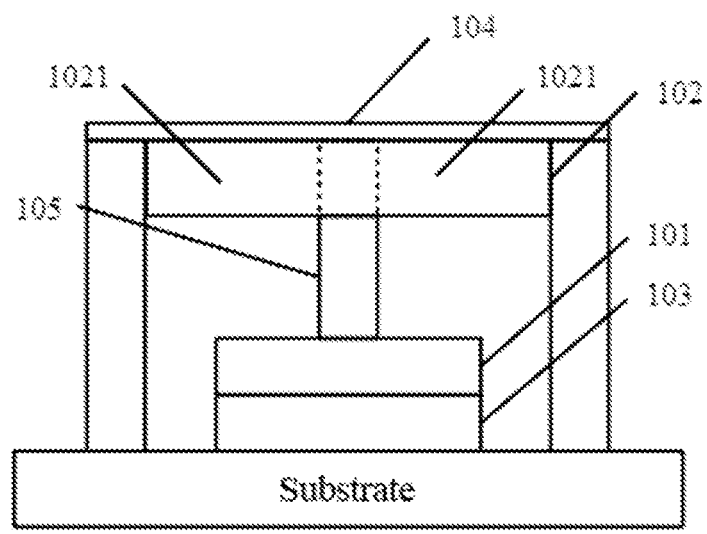

Specifically, the image sensing unit 101 is provided on a side of the micro-optics unit 102 away from an exterior reflection source, whose structure may refer to FIG. 6a and FIG. 6b; that is, the micro-optics unit 102 is provided between the image sensing unit 101 and the exterior reflection source; in such a setup, the exterior reflection source such as light reflected from the surface of a target object may enter the image sensing unit 101 after processing by micro-optics unit 102, so that the image sensing unit 101 may acquire the image processed by the micro-optics unit 102.

In the embodiments of the present application, the micro-optics unit 102 may be a micro-optics element with continuous surfaces or non-continuous surfaces. or may adopt but not limited to coded aperture, diffractive optical element, Fresnel lens, microlens array or optical homogenizer. In fact, any micro-optics element which is capable of processing images on the light reflected from the surface of a target object should be deemed to be covered by the scope of protection of the application, which is not limited herein in the present application.

Figure 5:
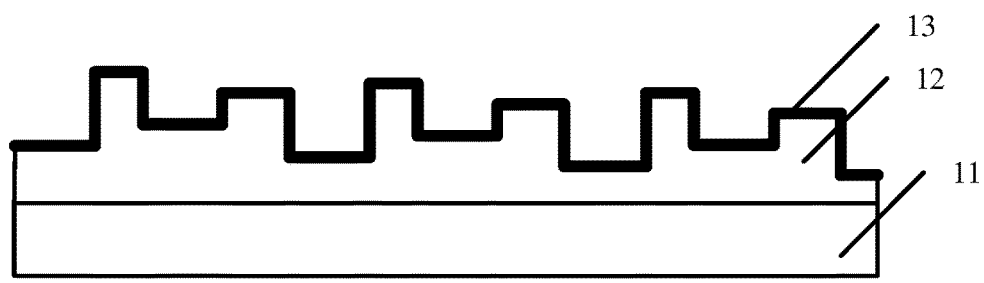
FIG. 5 is an illustrative structural diagram of the micro-optics unit 102 disclosed in the embodiments of the present application.

Taking a micro-optics element with non-continuous surface as an example, referring to FIG. 5, FIG. 5 is an example of the micro-optics unit 102 disclosed in the embodiments of the present application, which is provided with a glass substrate 11, a micro-optics structure 12 provided on the glass substrate 11, and AR coating 13 on a surface of micro-optics structure 12.

Specifically, a micro-optics unit 102, comprising multiple optical zones 1021 optically shielded from each other, wherein optical parameters of at least two optical zones 1021 among multiple optical zones 1021 are different from each other; an image sensing unit 101 is used for converting light processed through multiple optical zones 1021 of the micro-optics unit 102 into multiple corresponding image signals. Optionally, in the embodiments of the present application, the optical parameters include one or both of equivalent focal length and optical transfer function.

Specifically, the data processing unit 103 is connected to the image sensing unit 101, used for processing the image information acquired by the image sensing unit 101. Before specifically describing the processing of image information from image sensing unit 101, the imaging principle based on a micro-optics element, such as the micro-optics unit 102 in the present application, is briefly described:

The difference between traditional lens-based imaging and imaging based on a micro-optics element is that, macroscopically, the micro-optics element is structurally simpler, smaller and lighter than a lens, which may significantly simplify the structure of the vision sensor and provide better stability (temperature changes and vibration shocks have less impact on the optical properties of the element). It is to be noted that in an ideal lens imaging vision sensor, a point on the target object corresponds to a point on the image sensor (light is refracted and focused), while in an ideal micro-optics imaging vision sensor, a point on the target object corresponds to several points on the image sensor (light is scattered or diffracted), so the raw image acquired by the micro-optics vision sensor may not be identified by human eyes.

Expressed in a simplified model, the optical transfer function (also called the point spread function) of a lens imaging vision sensor approximates a one-to-one mapping Delta function as follows:

$$PSF = f(x, y, z) = \begin{cases} 1 & (x, y, z) = (x_0, y_0, z_0) \\ 0 & (x, y, z) <> (x_0, y_0, z_0) \end{cases}; \quad (1)$$

In contrast, the optical transfer function of a micro-optics imaging vision sensor is a one-to-many mapping complex function of:

$$PSF = g(x, y, z) = \begin{cases} 1 & (x, y, z) = (x_i, y_j, z_k), i, j, k = 1, 2, \ldots, M \\ 0 & (x, y, z) = (x_p, y_q, z_r), (p, q, r) <> (i, j, k) \end{cases}; \quad (2)$$

The actual imaging system optical transfer function is usually not a discrete function as expressed in equation (1) and equation (2), so equation (1) and equation (2) are approximate descriptions.

Further, the image acquired on the micro-optics imaging vision sensor may be expressed as $$i(u,v) = C\Sigma_{z=z1}^{z2}(w(x,y,z)*g(x,y,z)) + n(u,v) \quad (3);$$

z1 and z2 are depth boundaries of the target object; C is a systematic constant, w(x,y,z) is the surface feature of the target object on the position of (x,y,z), which may include texture, brightness and depth. g(x,y,z) is the optical transfer function in the equation (2), n(u,v) is the imaging noise of the image sensor at pixel (u,v), i(u,v) is the value acquired from the image sensor at pixel (u,v).

Further, the equation (3) may be rewritten as:

$$I = G \otimes w + n \quad (4);$$

I is the image acquired from the image sensor; G is the optical transfer function; w is the surface of the target object; n is the imaging noise; $\otimes$ is the convolution operation.

If the applied situation requires that the image acquired by the vision sensor should be provided to human eyes or a traditional-image-based processing method should be used, the data processing unit 103 may reconstruct the image acquired by the image sensing unit 101 (Essentially solving w based on equation (4)). In the applications of IoT and smart manufacturing, in most cases, the images acquired by vision sensors are shown directly to machines (i.e., the computer analyzes the images and makes decisions) instead of human. Therefore, the data processing unit 103 may also extract the required information from the image acquired by the image sensing unit 101.

More specifically, in the provision of the data processing unit 103 in the embodiment of the present application, two different ways may be adopted, including separated design and integrated design. Referring to FIG. 6a and FIG. 6b, FIG. 6a is a separated design. In a separated design, the heterogeneous micro-optics imaging module in the embodiment of the present application adopts a system architecture with an imaging module separated from a computing module, wherein the computing module, i.e., the data processing unit 103, may be implemented in software on an embedded System on Chip (SoC) or a separate computer system, and then the connection between the data processing unit 103 and the image sensing unit 101 is achieved through a data connection or electrical connection between the SoC or computer system and the imaging module, i.e., the image sensing unit 101. FIG. 6*b* is an integrated design. Under this circumstance, the heterogeneous micro-optics imaging module in the embodiment of the present application adopts an architecture with the highly integrated imaging module and computing module, wherein the computing module, i.e., the data processing unit 103, implements the required vision computing functions by adopting a dedicated vision chip (ASIC). The data processing unit 103 may be connected to the CMOS image sensor, i.e., the image sensing unit 101, by adopting a CMOS semiconductor processing process to achieve a data connection or electrical connection of the highly integrated vision sensing chip by 3D stacking (e.g., stacking a computing ASIC on the back of an image sensor), i.e., to achieve a connection between the data processing unit 103 and the image sensing unit 101.

Optionally, as shown in FIG. 6*a* and FIG. 6*b*, the heterogeneous micro-optics imaging module in the embodiment of the present application may also comprise an optical protection screen 104 provided on the micro-optics unit 102, whose main function is to prevent surface damage caused by mechanical impact scratches or chemical corrosion on the surface of micro-optics unit 102. Optionally, the optical protection screen 104 may adopt materials such as reinforced glass or acrylic panels with high light transmission. The optical protection screen 104 may be removed if such a risk does not exist in this situation, or if the heterogeneous micro-optics imaging module is mounted inside another system and thus already protected.

Optionally, on a side of the micro-optics unit 102 near the image sensing unit 101, or on a side of the image sensing unit 101 near the micro-optics unit 102, an optical filter device may be provided to further enable the selection or shielding of light of a specific wavelength.

Figure 7:
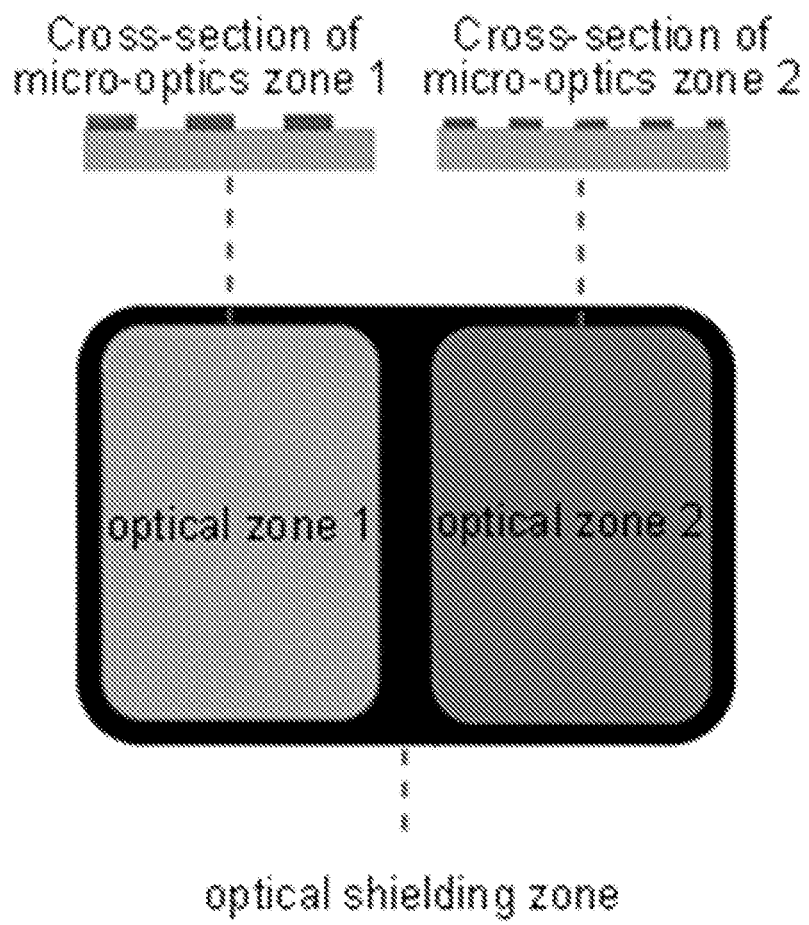
FIG. 7 is a designed structural diagram of a 2*1 micro-optics unit 102 disclosed in the embodiments of the present application.
Figure 8:
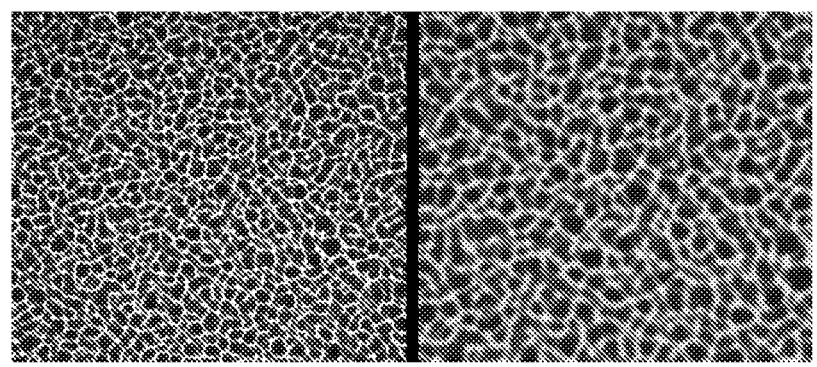
FIG. 8 is a visual comparison diagram of optical transfer function of a 2*1 micro-optics unit 102 disclosed in the embodiments of the present application.

The design of the micro-optics unit 102 may be referred to FIG. 7, which is a designed structural diagram of a 2*1 micro-optics unit 102, comprising an optical zone 10211 and an optical zone 10212. The cross-sections of the two optical zones are shown above; it can be seen that the geometric structure of the surfaces of the two optical zones is different, which leads to their different equivalent focal lengths and optical transfer functions. Specifically, the visual comparison of their optical transfer functions is shown in FIG. 8. It is to be noted that FIG. 8 shows the ideal optical transfer function for different equivalent focal length zones of a heterogeneous micro-optics element, i.e., when each zone is capable of imaging at its equivalent focal length. When images of different optical zones 1021 are acquired through the same image sensing unit 101 adopting the system architecture as shown in FIG. 6*a* and FIG. 6*b*, the imaging distances of different optical zones 1021 are the same. Thus, as shown in FIG. 8, only one optical zone 1021 (left) may achieve ideal focus, and the other optical zone 1021 (right) suffers from different degrees of out-of-focus condition. More specifically, the full black image area in the middle of FIG. 8 corresponds to the position of the optical shielding device 105 of FIG. 6*a* and FIG. 6*b*.

Further, the two optical zones, or multiple optical zones 1021 of the micro-optics unit 102 in the embodiments of the present application may also adopt different optical materials.

Obviously, multiple different levels of optical information in the same scene may be acquired in the embodiment of the present application by a micro-optics unit provided with multiple optical zones with different optical parameters, so as to increase the richness and volume of the acquired image information, which facilitates to decrease the loss of code information during the micro-optics imaging process, thereby increasing the stability of the optimizing process during the micro-optics image reconstruction.

In an optional embodiment, optical shielding devices 105 are provided between multiple optical zones 1021, wherein the optical shielding devices 105 are used to prevent light passing through any of the optical zones 1021 from entering other optical zones 1021. Specifically, referring to FIG. 6*a* and FIG. 6*b*, the optical shielding device 105 may be provided between the micro-optics unit 102 and the image sensing unit 101, so as to divide the micro-optics unit 102 into two optical zones 1021. In such a setup, the light enters through the left optical zone 1021 and is identified by the image sensing unit, so that the light does not enter the right optical zone 1021, thereby achieving good optical shielding effect.

Optionally, the optical shielding device 105 may adopt an optical isolating screen. Further, in order to prevent the light reflected by the surface of the optical shielding device 105 from influencing the image, the optical shielding device 105 should adopt a highly light-absorbing material. Specifically, the minimum requirement for the surface reflectivity of optical shielding device 105 is less than 1%.

Obviously, by implementing this optional embodiment, an optical shielding device may be adopted to optical shield multiple optical zones of the micro-optics unit, which prevents light passing through any of the optical zones from entering other optical zones, so as to prevent the image of any zones from being influenced by the light of the adjacent zones, which also facilitates the image sensing unit to acquire the accurate light information of multiple optical zones, thereby converting and acquiring accurate image information.

In an optional embodiment, the optical parameters in all optical zones 1021 of the micro-optics unit 102 are different from each other, so that the optical transfer functions or the equivalent focal lengths of each optical zone are varied, which realizes that multiple optical zones may acquire rich encoding information of the reflected light from the target object surface at several different levels, thereby facilitating to optimize the stability of the process during subsequent image reconstruction of the micro-optics image.

In an optional embodiment, the distance between the optical parameters of any two of the optical zones 1021 in all optical zones 1021 satisfies the difference maximization principle. Specifically, the distance between the optical parameters of any two of the optical zones 1021 in all optical zones 1021 satisfies the difference maximization principle, which may also be recited as: maximizing the sum of the distances between the optical parameters of any two optical zones 1021 in all optical zones 1021.

In the embodiment of the present application, the distance between the optical parameters is the absolute difference, Manhattan distance, Euclidean distance or Minkowski distance between the optical parameters. When the optical parameter is an optical transfer function, the distances between optical parameters may be computed by Manhattan distance, Euclidean distance, Minkowski distance, other common functions or distances between matrices.

In an optional embodiment, under consideration of the cost of design, the designed aim of the micro-optics unit 102 may be simplified. The distance between the optical parameters at the same height of any two of the optical zones 1021 in all optical zones 1021 satisfies the difference maximization principle, which may also be recited as: maximizing the sum of the distances between the optical parameters at same height of any two optical zones 1021 in all optical zones 1021.

Taking the 2*1 micro-optics unit 102 shown in FIG. 7 or FIG. 8 as an example, the designed aim of the micro-optics unit 102 may be determined as:

$$Diff_{inter} = \max \sum_{z1<z<z2} D(g1(x, y, z), g2(x, y, z))$$

Specifically, in order to realize that the sum of the distances between the optical parameters of any two optical zones 1021 in all optical zones 1021 is maximized, an iterative optimization algorithm may be adopted. The above aim is used as the aim of the algorithmic model, and the corresponding iterative optimization algorithm is used to compute the values of the optical parameters for each optical zone 1021 in all optical zones 1021, thereby determining the final design of the structural solution of the micro-optics unit 102.

In an optional embodiment, the difference between the equivalent focal lengths of any two of the optical zones 1021 in all optical zones 1021 is less than a predetermined equivalent focal length threshold. Specifically, the following setup may be provided: the absolute value of the difference between the equivalent focal lengths of the two optical zones 1021 which have the largest equivalent focal length differences among all optical zones 1021 is less than a preset equivalent focal length threshold. Taking the 2*1 micro-optics unit 102 shown in FIG. 7 or FIG. 8 as an example, the designed aim of the micro-optics unit 102 may be determined as:

|EF1−EF2|<EF$_{delta}$;

EF1 is the equivalent focal length of the left optical zone 1021; EF2 is the equivalent focal length of the right optical zone 1021; EF$_{delta}$ is the preset equivalent focal length threshold.

In an optional embodiment, the designed aim of the micro-optics unit 102 may be determined as: the optical parameters of at least two different positions within any one of the optical zones 1021 are different from each other. In such a setup, the optical transfer functions or equivalent focal lengths of different positions with each optical zone 1021 are different, which realizes that multiple optical zones may acquire rich encoding information of the reflected light from the target object surface at several different levels, thereby facilitating to optimize the stability of the process during subsequent image reconstruction of the micro-optics image.

Further, the designed aim of the micro-optics unit 102 may be determined as: the optical parameters at all positions within any one of the optical zones are different from each other, which realizes that multiple optical zones may acquire rich encoding information of the reflected light from the target object surface at several different levels, thereby facilitating to optimize the stability of the process during subsequent image reconstruction of the micro-optics image.

Further, under consideration of the designed cost and the computational cost, the designed aim of the micro-optics unit 102 may be simplified and determined as: the optical parameters at any two different positions of different heights within any one of the optical zones 1021 are different from each other. Taking the 2*1 micro-optics unit 102 shown in FIG. 7 or FIG. 8 as an example, the designed aim of the micro-optics unit 102 may be determined as:

$$g(x,y,z)=g(x-\zeta, y-\eta, z)$$

therefore, in such designed micro-optics unit 102, the optical transfer functions of any two different positions at same height within any one of the optical zones 1021 are the same, which simplifies the computation in a certain degree and reduces the computational cost.

In an optional embodiment, the designed aim of the micro-optics unit 102 may be determined as: the distance between the optical parameters at any two positions with same height within any one of the optical zones 1021 satisfies the difference maximization principle. Specifically, this designed aim may be recited as: maximizing the sum of the distances between the optical parameters at any two positions with same height within any one of the optical zones 1021.

Taking the 2*1 micro-optics unit 102 shown in FIG. 7 or FIG. 8 as an example, the designed aim of the micro-optics unit 102 may be determined as:

$$Diff_{intra} = \max \sum_{z1<za,zb<z2} D(g(x, y, za), g(x, y, zb))$$

D(g(x,y,za), g(x,y,zb)) is the distance between two functions or matrices.

Specifically, in order to realize that the sum of the distances between the optical parameters at any two positions with same height within any one of the optical zones 1021 is maximized, an iterative optimization algorithm may be adopted. The above aim is used as the aim of the algorithmic model, and the corresponding iterative optimization algorithm is used to compute the values of the optical parameters for each position at the same height within any one of the optical zones 1021, thereby determining the final design of the structural solution of the micro-optics unit 102.

Embodiment 2

Figure 2:
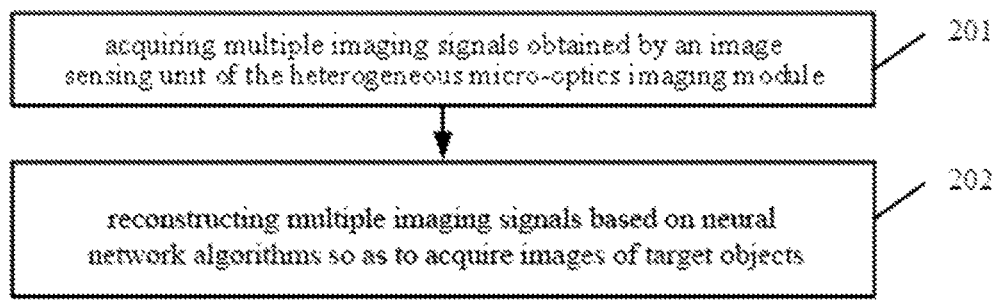
FIG. 2 is a flow chart of a method for image reconstruction of the heterogeneous micro-optics imaging module disclosed in the embodiments of the present application.

Referring to FIG. 2, FIG. 2 is a flow chart of a method for image reconstruction of the heterogeneous micro-optics imaging module disclosed in the embodiments of the present application. The method described in FIG. 2 may be applied to the computational device for image reconstruction on the image information acquired by the heterogeneous micro-optics imaging module disclosed in the embodiment 1 of the present application. The computational device may be correspondingly a computational terminal, computational device or server, wherein the server may be a local server or a cloud server, which is not limited in the embodiments of the present application. As shown in FIG. 2, the method for image reconstruction of heterogeneous micro-optics imaging module may comprise following steps:

At step 201, acquiring multiple imaging signals obtained by an image sensing unit of the heterogeneous micro-optics imaging module.

Specifically, multiple imaging signals correspond to multiple optical zones respectively;

At step 202, reconstructing multiple imaging signals based on neural network algorithms so as to acquire images of target objects.

In the embodiment of the present application, reconstruction of multiple image signals may be individual reconstruction of a single image signal to obtain an image of the target object, or simultaneous reconstruction of multiple image signals, so that the optical information of the target object of multiple different depths and different levels acquired by the heterogeneous micro-optics imaging module disclosed in embodiment 1 may be utilized to acquire a more accurate and realistic image of the target object.

Obviously, multiple image signals acquired by the image sensing unit of the heterogeneous micro-optics imaging module in the embodiment of the present application may be reconstructed based on the neural network algorithm, so as to acquire the image of the target object, so that the accuracy and the restored degree of reality on the image of the target object acquired by reconstruction may be increased by means of the optical information of multiple different levels at the same scene acquired by the micro-optics unit of optical zone with multiple different optical parameters, which facilitates to decrease the loss of code information during the micro-optics imaging process, thereby increasing the stability of the optimizing process during the micro-optics image reconstruction.

In an optional embodiment, the step 202 of reconstructing multiple imaging signals based on neural network algorithms so as to acquire images of target objects, comprises:

acquiring multiple image signals, and inputting multiple image signals into a pre-trained neural network model to implement image reconstruction;

acquiring a result of the image reconstruction output by the neural network model, and identifying the result of the image reconstruction as the image of the target object.

Specifically, taking the 2*1 micro-optics unit 102 shown in FIG. 7 or FIG. 8 as an example, the two piece of different image information $I_1$ and $I_2$ are acquired by the image sensing unit 101, wherein each piece of the image information $I_i$ (i=1, 2) corresponds to the optical transfer function $G_i$(i=1, 2) of an optical zone. As known from the description on the principle of the image reconstruction in the embodiment 1, the process of image reconstruction is to optimize the solution by combining the following two formulas w(x,y,z):

$$I_1 = G_1 \otimes w + n \quad (9);$$

$$I_2 = G_2 \otimes w + n \quad (10);$$

The process of solving w(x,y,z) from equation (9) and equation (10) is an inverse problem solving and may be achieved by iterative optimization. For the intermediate solution w'(x,y,z) of w(x,y,z), the image values corresponding to equation (9) and equation (10) are $I'_1$ and $I'_2$.

Then the aim function of the iterative optimization of the neural network model is:

$$\text{obj} = D(I_1, I_1') + D(I_2, I_2') = D(I_1, G_1 \otimes w') + D(I_2, G_2 \otimes w') \quad (11);$$

D(x,y) is the distance function, which is defined in the same way as in equation (6).

Figure 9:
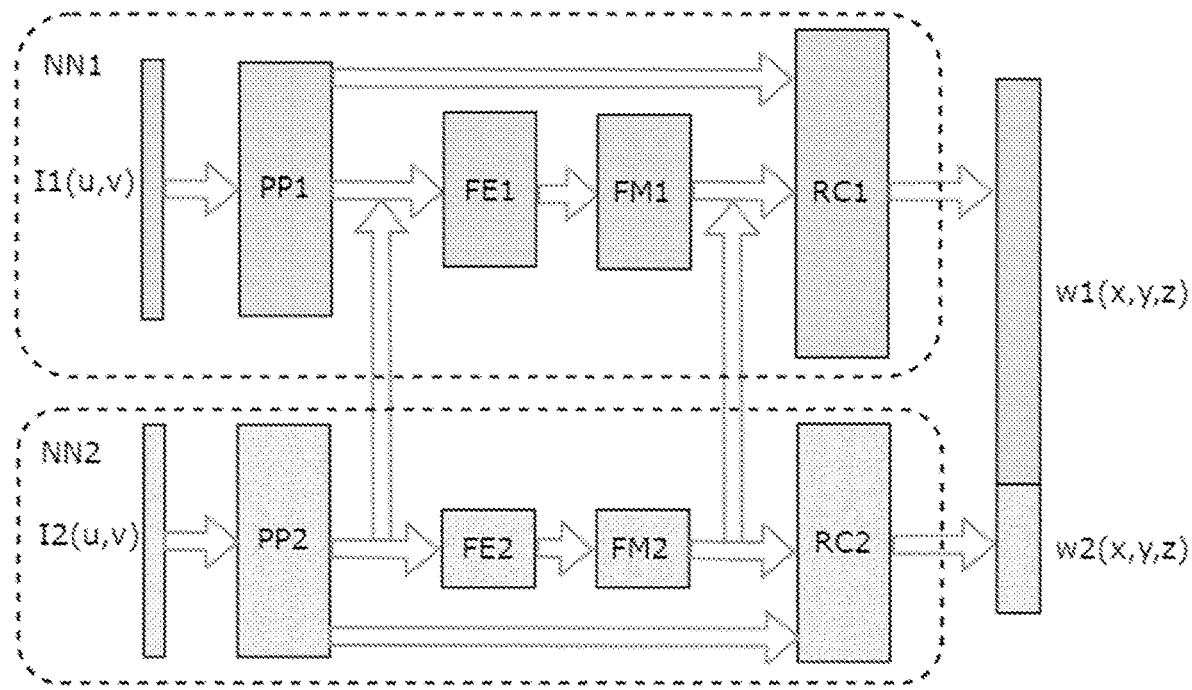
FIG. 9 is a structural diagram of a heterogeneous deep neural network disclosed in the embodiments of the present application.

Specifically, in the embodiment of the present application, the neural network model may adopt a Heterogenous Reconstruction Neural Network (HRecNN) to achieve the above-mentioned image reconstruction, the structure thereof may be referred to FIG. 9. This neural network model of HRecNN consists mainly of two UNet-like neural network modules (NN1 and NN2), NN1 and NN2 corresponding to different regions of the heterogeneous micro-optics device (equation (9) and equation (10)), while the co-optimization of equation (10) and equation (11) is achieved through the input to NN1 from the intermediate link of NN2. (i.e., the aim function expressed in equation (11) is achieved through the internal structure of the neural network)

Specifically, the input to NN1 from the intermediate link of NN2 essentially enables the output result of the network, $w_1(x,y,z)$, to be the result of the conjunction of the images $I_1$ and $I_2$ acquired through optical zones 1 and 2. Without the input from NN2 to NN1, $w_1(x,y,z)$ takes into account only the effect of the image $I_1$ acquired in optical zone 1. This is also indicated by equation (11), in which the result of solving w(x,y,z) requires both $I_1$ and $I_2$ as inputs.

Figure 10:
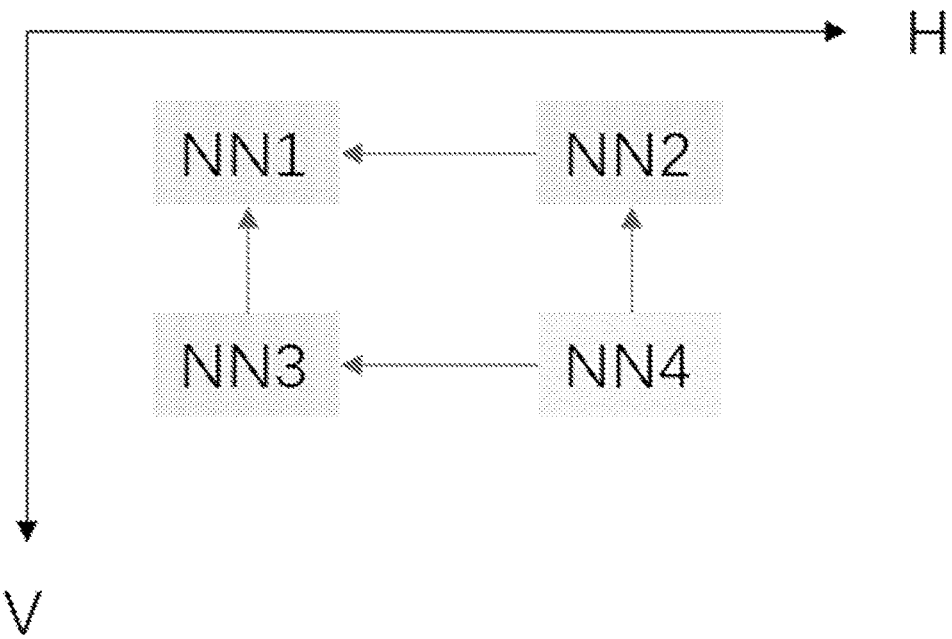
FIG. 10 is an output result diagram of image reconstruction of a heterogeneous deep neural network disclosed in the embodiments of the present application.

It should be noted that the image reconstruction output $w_1(x,y,z)$ of HDNN in FIG. 9 contains the image inputs of two heterogeneous micro-optics zones. From the viewpoint of optics, $w_1(x,y,z)$ represents the target object within the common field of view of the two heterogeneous micro-optics zones, while $w_2(x,y,z)$ represents the target object within the field of view of the micro-optics zone with small equivalent focal length and outside the field of view of the micro-optics zone with large equivalent focal length, wherein the image reconstruction output is shown in FIG. 10.

Since the target objects within the common field of view of heterogeneous micro-optics imaging are encoded and sampled by different micro-optics zones, the equivalent optical transfer function during the reconstruction process is a combination of the optical transfer functions of different micro-optics zones, which may greatly improve the stability and reliability of the image reconstruction and the accuracy of the image reconstruction within the common field of view.

Figure 11:
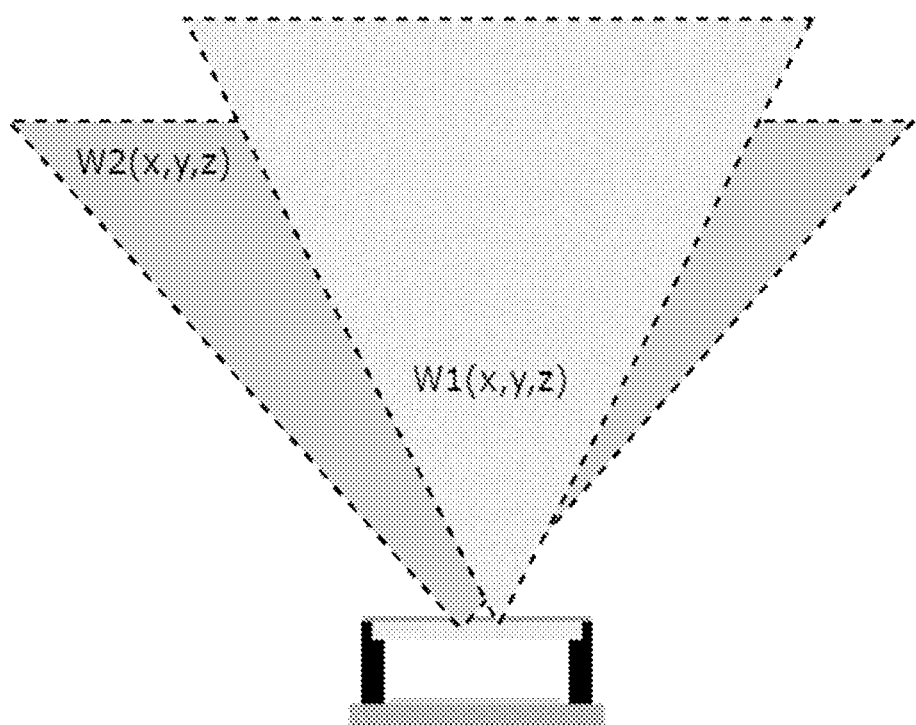
FIG. 11 is a structural diagram of another heterogeneous deep neural network disclosed in the embodiments of the present application.

Further, in case of more than two optical zones, the neural network corresponding to each adjacent two optical zones may be extended in the horizontal (H) and vertical (V) directions respectively according to the structure illustrated in FIG. 9, so that the final acquired neural network output w(x,y,z) is the result of the combination of the images acquired by all optical zones. For example, with respect to the four optical zones of 2*2, the high-level structure of the neural network is shown in FIG. 11, wherein the NN1 and NN2 are consistent as shown in FIG. 9, while the relationships between NN1 and NN3, NN2 and NN4, and NN3 and NN4 are the same as those between NN1 and NN2.

The main advantages of the technical solution formed by the heterogeneous micro-optics imaging module of embodiment 1 and the image reconstruction method of embodiment 2 are summarized herein:

1. Achieving ultra-compact vision sensors by combining heterogeneous micro-optics elements with the same image sensor, and acquiring both 2D and 3D image information through a single image sensor;
2. Breaking through the limitation of a single micro-optics imaging element imaging on sensor field of view and image reconstruction resolution, allowing micro-optics imaging sensors to simultaneously extend the field of view and improve the resolution of image reconstruction;
3. Improving the variability (uniqueness) of optical transfer functions at different target distances through the design of optical transfer functions for different optical zones of heterogeneous micro-optics elements, which reduces the loss of coded information during micro-optics imaging, thereby improving the stability of the optimizing process during image reconstruction of micro-optics imaging;
4. Achieving image reconstruction of heterogeneous micro-optics element imaging by heterogeneous deep neural networks and achieving co-optimization of image reconstruction by internal structure of neural networks.

Embodiment 3

Figure 3:
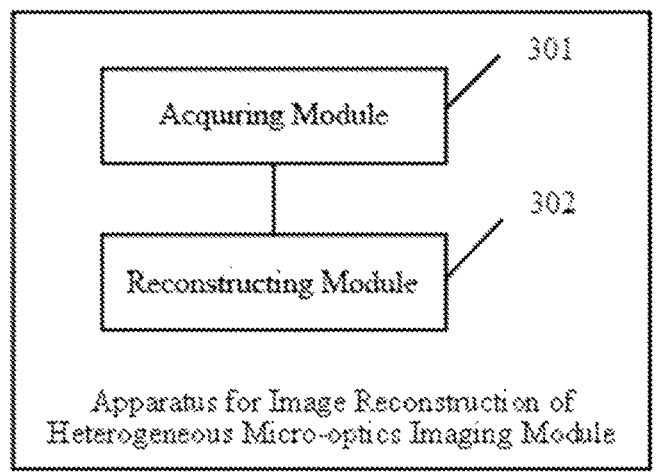
FIG. 3 is a structural diagram of an apparatus for image reconstruction of the heterogeneous micro-optics imaging module disclosed in the embodiments of the present application.

Referring to FIG. 3, FIG. 3 is a structural diagram of an apparatus for image reconstruction of the heterogeneous micro-optics imaging module disclosed in the embodiments of the present application. The apparatus described in FIG. 3 may be applied to the computational device for image reconstruction on the image information acquired by the heterogeneous micro-optics imaging module disclosed in the embodiment 1 of the present application. The computational device may be correspondingly a computational terminal, computational device or server, wherein the server may be a local server or a cloud server, which is not limited in the embodiments of the present application. As shown in FIG. 3, the apparatus may comprise:

an acquiring module 301, used for acquiring multiple imaging signals obtained by an image sensing unit of the heterogeneous micro-optics imaging module, specifically, wherein multiple imaging signals correspond to multiple optical zones respectively;

a reconstructing module 302, used for reconstructing multiple imaging signals based on neural network algorithms so as to acquire images of target objects.

In the embodiment of the present application, the reconstructing module 302 reconstructs multiple image signals, in which it may be individual reconstruction of a single image signal to obtain an image of the target object, or simultaneous reconstruction of multiple image signals, so that the optical information of the target object of multiple different depths and different levels acquired by the heterogeneous micro-optics imaging module disclosed in embodiment 1 may be utilized to acquire a more accurate and realistic image of the target object.

Obviously, multiple image signals acquired by the image sensing unit of the heterogeneous micro-optics imaging module in the embodiment of the present application may be reconstructed based on the neural network algorithm, so as to acquire the image of the target object, so that the accuracy and the restored degree of reality on the image of the target object acquired by reconstruction may be increased by means of the optical information of multiple different levels at the same scene acquired by the micro-optics unit of optical zone with multiple different optical parameters, which facilitates to decrease the loss of code information during the micro-optics imaging process, thereby increasing the stability of the optimizing process during the micro-optics image reconstruction.

In an optional embodiment, the reconstructing module 302 reconstructs multiple imaging signals based on neural network algorithms so as to acquire images of target objects.

acquiring multiple image signals, and inputting multiple image signals into a pre-trained neural network model to implement image reconstruction;

acquiring a result of the image reconstruction output by the neural network model, and identifying the result of the image reconstruction as the image of the target object.

Specifically, taking the 2*1 micro-optics unit 102 shown in FIG. 7 or FIG. 8 as an example, the two piece of different image information $I_1$ and $I_2$ are acquired by the image sensing unit 101, wherein each piece of the image information $I_i$ (i=1, 2) corresponds to the optical transfer function $G_i$(i=1, 2) of an optical zone. As known from the description on the principle of the image reconstruction in the embodiment 1, the process of image reconstruction is to optimize the solution by combining the following two formulas w(x,y,z):

$$I_1 = G_1 \circledast w + n \quad (9);$$

$$I_2 = G_2 \circledast w + n \quad (10);$$

The process of solving w(x,y,z) from equation (9) and equation (10) is an inverse problem solving and may be achieved by iterative optimization. For the intermediate solution w'(x,y,z) of w(x,y,z), the image values corresponding to equation (9) and equation (10) are $I'_1$ and $I'_2$.

Then the aim function of the iterative optimization of the neural network model is:

$$\text{obj} = D(I_1, I_1') + D(I_2, I_2') = D(I_1, G_1 \circledast w') + D(I_2, G_2 \circledast w') \quad (11);$$

D(x,y) is the distance function, which is defined in the same way as in equation (6).

Specifically, in the embodiment of the present application, the neural network model may adopt a Heterogenous Reconstruction Neural Network (HRecNN) to achieve the above-mentioned image reconstruction, the structure thereof may be referred to FIG. 9. This neural network model of HRecNN consists mainly of two UNet-like neural network modules (NN1 and NN2), NN1 and NN2 corresponding to different regions of the heterogeneous micro-optics device (equation (9) and equation (10)), while the co-optimization of equation (10) and equation (11) is achieved through the input to NN1 from the intermediate link of NN2. (i.e., the aim function expressed in equation 11 is achieved through the internal structure of the neural network)

Specifically, the input to NN1 from the intermediate link of NN2 essentially enables the output result of the network, $w_1(x,y,z)$, to be the result of the conjunction of the images $I_1$ and $I_2$ acquired through optical zones 1 and 2. Without the input from NN2 to NN1, $w_1(x,y,z)$ takes into account only the effect of the image $I_1$ acquired in optical zone 1. This is also indicated by equation (11), in which the result of solving w(x,y,z) requires both $I_1$ and $I_2$ as inputs.

It should be noted that the image reconstruction output $w_1(x,y,z)$ of HDNN in FIG. 9 contains the image inputs of two heterogeneous micro-optics zones. From the viewpoint of optics, $w_1(x,y,z)$ represents the target object within the common field of view of the two heterogeneous micro-optics zones, while $w_2(x,y,z)$ represents the target object within the field of view of the micro-optics zone with small equivalent focal length and outside the field of view of the micro-optics zone with large equivalent focal length, wherein the image reconstruction output is shown in FIG. 10.

Since the target objects within the common field of view of heterogeneous micro-optics imaging are encoded and sampled by different micro-optics zones, the equivalent optical transfer function during the reconstruction process is a combination of the optical transfer functions of different micro-optics zones, which may greatly improve the stability and reliability of the image reconstruction and the accuracy of the image reconstruction within the common field of view.

Further, in case of more than two optical zones, the neural network corresponding to each adjacent two optical zones may be extended in the horizontal (H) and vertical (V) directions respectively according to the structure illustrated in FIG. 9, so that the final acquired neural network output w(x,y,z) is the result of the combination of the images acquired by all optical zones. For example, with respect to the four optical zones of 2*2, the high-level structure of the neural network is shown in FIG. 11, wherein the NN1 and NN2 are consistent as shown in FIG. 9, while the relationships between NN1 and NN3, NN2 and NN4, and NN3 and NN4 are the same as those between NN1 and NN2.

Embodiment 4

Figure 4:
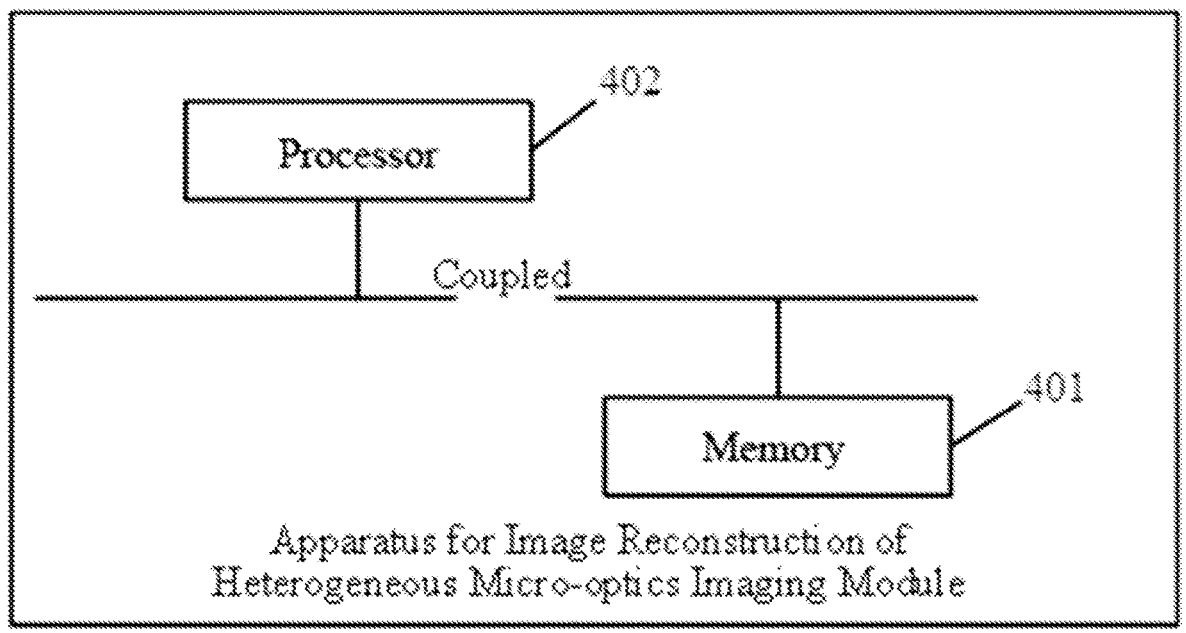
FIG. 4 is a structural diagram of another apparatus for image reconstruction of the heterogeneous micro-optics imaging module disclosed in the embodiments of the present application.

Referring to FIG. 4, FIG. 4 is a structural diagram of another apparatus for image reconstruction of the heterogeneous micro-optics imaging module disclosed in the embodiments of the present application. As shown in FIG. 4, the apparatus may comprise:

a memory 401, memorized with an executable program, and a processor 402, coupled with the memory 401, wherein the processor 402, calling the executable program memorized in the memory 401, implements some or all steps of the method for image reconstruction of heterogeneous micro-optics imaging module disclosed in the embodiment 1 of the present application.

Embodiment 5

Disclosed in the present embodiment of the application is a computer program product comprising a non-instantaneous computer readable memory medium memorized with a computer program, the computer program enabling the computer to implement some or all steps in the method of image reconstruction of heterogeneous micro-optics imaging module, disclosed in the Embodiment 1 of the present application.

It is only schematic to describe the aforementioned embodiment of the apparatus. The modules described as separate components may or may not be physically separated, and the modules used as components for display may or may not be physical modules, that is, they may be located in the same place or may be distributed to multiple network modules. Some or all these modules may be selected according to practical demands to achieve the purpose of the solution of the present embodiment. It may be understood and implemented by a person of ordinary skill in the art without inventive effort.

With the specific description of the above embodiments, it is clear to those skilled in the art that the various implementations may be implemented with the aid of software plus the necessary common hardware platform, and of course, with the aid of hardware. Based on this understanding, the above technical solutions that essentially or contribute to the prior art may be embodied in the form of a software product which may be memorized in a computer-readable memory medium, the memory medium including Read-Only Memory, Random Access Memory, Programmable Read-only Memory, Erasable Programmable Read Only Memory, One-time Programmable Read-Only Memory, Electrically-Erasable Programmable Read-Only Memory, Compact Disc Read-Only Memory, other Compact Disc Memory, Disk Memory, Tape Memory or any other computer-readable medium that may be used to carry or memorize data.

Finally, it should be noted that the method and apparatus of heterogeneous micro-optics imaging module and image reconstruction thereof disclosed in the embodiments of the present application are only preferred embodiments of the present application, and are only used to illustrate the technical solutions of the present application, but not to limit them. Despite the detailed description of the application with reference to the aforementioned embodiments, it should be understood, by those skilled in the art, that the technical solutions recorded in the aforementioned embodiments may still be modified, or equivalent substitutions for some of the technical features thereof may be made; which the essence of the corresponding technical solutions of these modifications or substitutions is without departing from the spirit and scope of the technical solutions of the various embodiments of the application.

The invention claimed is:

1. A heterogeneous micro-optics imaging module, characterized by comprising:

a micro-optics unit, comprising a plurality of optical zones optically shielded from each other, wherein optical parameters of at least two optical zones among a plurality of the optical zones are different from each other, and the optical parameters of at least two different positions within any one of the optical zones are different from each other, wherein the optical parameters include one or both of equivalent focal length and optical transfer function, and/or the micro-optics unit is a coded aperture, diffractive optical element, Fresnel lens, microlens array or optical homogenizer; and an image sensing unit, provided on a side of the micro-optics unit away from an exterior reflection source, used for converting light processed through a plurality of the optical zones of the micro-optics unit into a plurality of corresponding image signals.

2. The heterogeneous micro-optics imaging module according to claim 1, characterized in that optical shielding devices are provided between a plurality of the optical zones, wherein the optical shielding devices are used to prevent light passing through any of the optical zones from entering other optical zones.

3. A method for image reconstruction of heterogeneous micro-optics imaging module, used for reconstruction of image information acquired by the heterogeneous micro-optics imaging module as claimed in claim 2, characterized by comprising:

acquiring a plurality of imaging signals obtained by an image sensing unit of the heterogeneous micro-optics imaging module, wherein a plurality of the imaging signals corresponds to a plurality of the optical zones respectively; and reconstructing a plurality of the imaging signals based on neural network algorithms so as to acquire images of target objects.

4. An apparatus for image reconstruction of heterogeneous micro-optics imaging module, used for reconstruction of image information acquired by heterogeneous micro-optics imaging module as claimed in claim 2, characterized by comprising:

an acquiring module, used for acquiring a plurality of imaging signals obtained by an image sensing unit of the heterogeneous micro-optics imaging module, wherein a plurality of the imaging signals corresponds to a plurality of the optical zones respectively; and a reconstructing module, used for reconstructing a plurality of the imaging signals based on neural network algorithms so as to acquire images of target objects.

5. The heterogeneous micro-optics imaging module according to claim 1, characterized in that the optical parameters of all optical zones are different from each other, and/or a distance between the optical parameters of any two of the optical zones in all optical zones satisfies a difference maximization principle.

6. The heterogeneous micro-optics imaging module according to claim 5, characterized in that a difference between equivalent focal lengths of any two of the optical zones in all optical zones is less than a predetermined equivalent focal length threshold.

7. The heterogeneous micro-optics imaging module according to claim 6, characterized in that the distance between the optical parameters is an absolute difference, Manhattan distance, Euclidean distance or Minkowski distance between the optical parameters.

8. A method for image reconstruction of heterogeneous micro-optics imaging module, used for reconstruction of image information acquired by the heterogeneous micro-optics imaging module as claimed in claim 6, characterized by comprising:
   acquiring a plurality of imaging signals obtained by an image sensing unit of the heterogeneous micro-optics imaging module, wherein a plurality of the imaging signals corresponds to a plurality of the optical zones respectively; and
   reconstructing a plurality of the imaging signals based on neural network algorithms so as to acquire images of target objects.

9. An apparatus for image reconstruction of heterogeneous micro-optics imaging module, used for reconstruction of image information acquired by heterogeneous micro-optics imaging module as claimed in claim 6, characterized by comprising:
   an acquiring module, used for acquiring a plurality of imaging signals obtained by an image sensing unit of the heterogeneous micro-optics imaging module, wherein a plurality of the imaging signals corresponds to a plurality of the optical zones respectively; and
   a reconstructing module, used for reconstructing a plurality of the imaging signals based on neural network algorithms so as to acquire images of target objects.

10. The heterogeneous micro-optics imaging module according to claim 5, characterized in that the optical parameters at all positions within any one of the optical zones are different from each other, and/or the optical parameters at any two different positions of different heights within any one of the optical zones are different from each other, and/or the distance between the optical parameters at any two positions with same height within any one of the optical zones satisfies the difference maximization principle.

11. The heterogeneous micro-optics imaging module according to claim 10, characterized in that the distance between the optical parameters is an absolute difference, Manhattan distance, Euclidean distance or Minkowski distance between the optical parameters.

12. The heterogeneous micro-optics imaging module according to claim 5, characterized in that the distance between the optical parameters is an absolute difference, Manhattan distance, Euclidean distance or Minkowski distance between the optical parameters.

13. A method for image reconstruction of heterogeneous micro-optics imaging module, used for reconstruction of image information acquired by the heterogeneous micro-optics imaging module as claimed in claim 4, characterized by comprising:
   acquiring a plurality of imaging signals obtained by an image sensing unit of the heterogeneous micro-optics imaging module, wherein a plurality of the imaging signals corresponds to a plurality of the optical zones respectively; and
   reconstructing a plurality of the imaging signals based on neural network algorithms so as to acquire images of target objects.

14. An apparatus for image reconstruction of heterogeneous micro-optics imaging module, used for reconstruction of image information acquired by heterogeneous micro-optics imaging module as claimed in claim 5, characterized by comprising:
   an acquiring module, used for acquiring a plurality of imaging signals obtained by an image sensing unit of the heterogeneous micro-optics imaging module, wherein a plurality of the imaging signals corresponds to a plurality of the optical zones respectively; and
   a reconstructing module, used for reconstructing a plurality of the imaging signals based on neural network algorithms so as to acquire images of target objects.

15. A method for image reconstruction of heterogeneous micro-optics imaging module, used for reconstruction of image information acquired by the heterogeneous micro-optics imaging module as claimed in claim 1, characterized by comprising:
   acquiring a plurality of imaging signals obtained by an image sensing unit of the heterogeneous micro-optics imaging module, wherein a plurality of the imaging signals corresponds to a plurality of the optical zones respectively; and
   reconstructing a plurality of the imaging signals based on neural network algorithms so as to acquire images of target objects.

16. An apparatus for image reconstruction of heterogeneous micro-optics imaging module, characterized by comprising:
   a memory, memorized with an executable program, and
   a processor, coupled with the memory,
   wherein the processor, calling the executable program memorized in the memory, implements the method for image reconstruction of heterogeneous micro-optics imaging module according to claim 15.

17. An apparatus for image reconstruction of heterogeneous micro-optics imaging module, used for reconstruction of image information acquired by heterogeneous micro-optics imaging module as claimed in claim 1, characterized by comprising:
   an acquiring module, used for acquiring a plurality of imaging signals obtained by an image sensing unit of the heterogeneous micro-optics imaging module, wherein a plurality of the imaging signals corresponds to a plurality of the optical zones respectively; and
   a reconstructing module, used for reconstructing a plurality of the imaging signals based on neural network algorithms so as to acquire images of target objects.

* * * * *